April 25, 1972                 G. M. LOW               3,658,974
DEPUTY ADMINISTRATOR OF THE NATIONAL
AERONAUTICS AND SPACE ADMINISTRATION
METHOD OF FORMING SHAPES FROM PLANAR SHEETS OF
THERMOSETTING MATERIALS
Filed May 28, 1970

JAMES A. SCHOLL
INVENTOR

ATTORNEYS

United States Patent Office 3,658,974
Patented Apr. 25, 1972

3,658,974
METHOD OF FORMING SHAPES FROM PLANAR SHEETS OF THERMOSETTING MATERIALS
George M. Low, Deputy Administrator of the National Aeronautics and Space Administration, with respect to an invention of James A. Scholl, Riverside, Calif.
Filed May 28, 1970, Ser. No. 41,346
Int. Cl. B29d 3/02; B29g 5/00
U.S. Cl. 264—92
3 Claims

ABSTRACT OF THE DISCLOSURE

A method of forming shapes from planar sheets of thermosetting honeycomb core particularly suited for use in forming the center sections for aeroshells and the like, characterized by steps of heat-shocking thermosetting honeycomb core stock, deforming the sheet about a male forming tool having a surface of a predetermined configuration, and curing the thus deformed sheet while subjecting it to a holding vacuum applied thereto through a curved supporting surface of a female forming tool.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION (1) Field of the invention

The invention relates to a method of deforming planar sheets of thermosetting material, and more particularly to a method for forming aeroshell center sections from sheets of thermosetting honeycomb core materials.

(2) Description of the prior art

Currently, due to the structural strength, weight and thermal properties of honeycomb core formed for thermosetting resins, numerous types of aerodynamic bodies frequently are fabricated therefrom. For example, such material has been found to be particularly suited for use in fabricating center sections of aeroshells for flight capsules. Normally, honeycomb core includes a myriad of openings defined by extremely brittle walls which impart to the sheets the selected weight and thermal characteristics. Since such sheets are quite brittle, due to the thermosetting characteristics of the resin, difficulty often is encountered in fabricating therefrom shapes conforming to compound curves. In instances where attempts have been made to fabricate a shape by deforming an uncured sheet, and to then cure the sheet in its deformed state, the resulting shape tends to experience "springback," thus rendering the shape unsatisfactory for use in environments where minimal deviation from a given configuration must be achieved and maintained.

One material currently employed in the fabrication of aeroshells is a honeycomb core formed of a thermosetting resin having a density of approximately four and one-half pounds per cubic foot and adapted to be cured by being subjected to a temperature of approximately 375° F. for a period of approximately two hours. In fabricating shapes from this material, conforming to a compound curve it heretofore has been common practice to form the desired shapes by severing-and-slicing techniques wherein cured sheets of the material are cut into appropriate shapes and then spliced into shapes having desired configurations, due to the fact that this material tends to fracture when subjected to strain-inducing stress.

Therefore, there currently exists a need for a practical and efficient method for forming planar sheets of thermosetting honeycomb core material into shapes having surfaces conforming to preselected compound curves.

OBJECTS AND SUMMARY OF THE INVENTION

It is therefore an object of the instant invention to provide an improved method of forming shapes from planar sheets of thermosetting honeycomb core material.

It is another object to provide an improved method for fabricating shapes having surfaces conforming to compound curves from substantially rigid sheets of thermosetting honeycomb core material.

It is another object to provide an improved method of forming planar sheets of thermosetting honeycomb core material into shapes particularly suited for use as center sections for aeroshells.

It is another object to provide an improved method of fabricating shapes having surfaces conforming to compound curves from rigid planar sheets of thermosetting material wherein partially cured sheets of the material are heat-shocked and deformed into preselected configurations and then cured while maintained in their deformed configurations.

It is another object to provide an improved method of forming aerodynamic shapes from substantially rigid planar sheets of thermosetting honeycomb core material wherein a partially cured planar sheet of honeycomb core material is heat-shocked, deformed about a convex surface and subsequently cured while forcibly supported in engagement with a concave surface.

These and other objects and advantages are achieved through a simplified method wherein planar sheets of partially cured, substantially rigid thermosetting honeycomb core material are heat-shocked and then deposited over a convex forming tool, drawn downwardly about the tool so that the sheets initially are caused to assume concave configurations, and finally heat-curing the thus deformed sheets of thermosetting material at elevated temperatures while they are retained within a concave female tool through an applied vacuum.

DESCRIPTION OF THE PREFERRED EMBODIMENT

Figure 1:
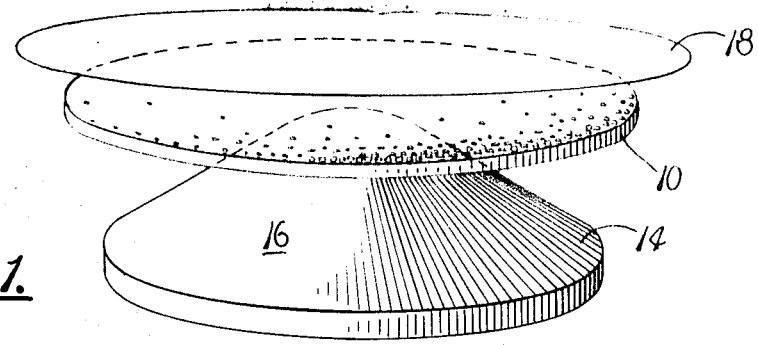
FIG. 1 is an exploded perspective view illustrating a positioning of a sheet of the thermosetting honeycomb core stock between a polyvinyl film and a convex working tool.
Figure 2:
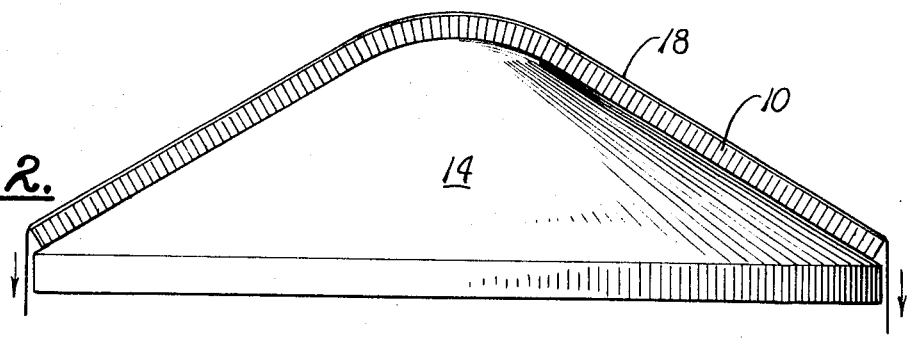
FIG. 2 is a sectioned view of a deformed sheet of honeycomb core stock material.
Figure 3:
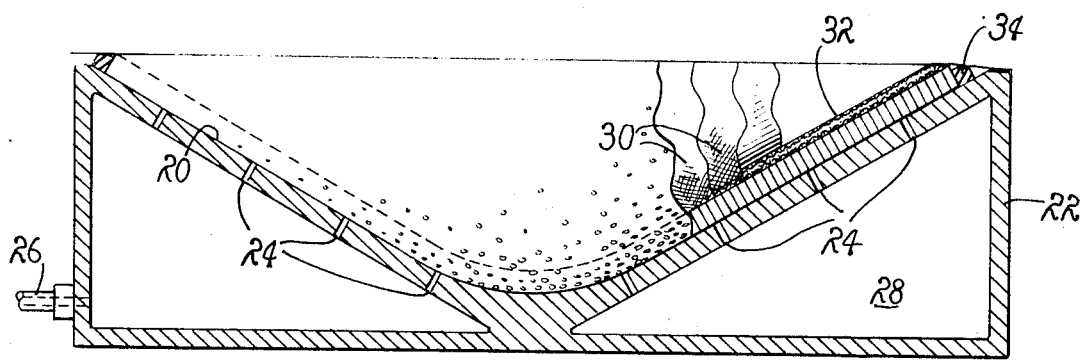
FIG. 3 is a sectioned view illustrating a positioning of the deformed sheet of FIG. 2 as it is supported by a vacuum within a concave working tool.
Figure 4:
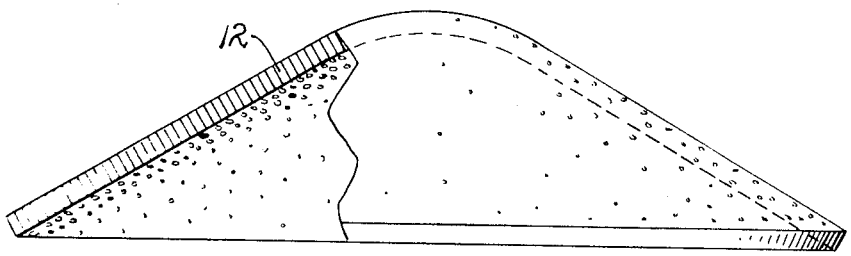
FIG. 4 is a partially sectioned elevation of a shape fabricated according to the method embodying the principles of the instant invention.

Referring now to the drawings wherein like reference characters designate like or corresponding parts throughout several views, there is shown in FIG. 1 a planar sheet 10 of a thermosetting honeycomb core stock which is to be deformed into a fabricated shape 12, FIG. 3. The sheet 10 normally is severed from a substantially rigid planar sheet of thermosetting honeycomb core material which has not been fully cured in order that its thermoplastic characteristics may be utilized and its final curing be achieved after the sheet has been deformed into a predetermined shape.

The material of the sheet 10, in its partially cured state is rather brittle and readily fractures when subjected to deforming stress; however, the material in its partially cured state possesses thermoplastic characteristics. Hence the sheet 10 may be softened and rendered malleable through a heat-shocking process. In practice, heat-shocking is achieved by inserting the partially cured sheet 10 into an oven heated to a temperature substantially above the curing temperature of the material. As the material is heated, for a relatively short period of time, it is softened sufficiently to accommodate deformation whereupon it is removed from the oven.

The heat-shocked sheet 10 is positioned over a working tool 14 having a convex upper surface 16 conforming to a preselected compound curve. As a practical matter, the surface of the tool 14 is a male tool which may conform to various shapes including a hemisphere, a cone, or a paraboloid. In any event, while the sheet 10 is still in its heated and softened state a downwardly directed pressure evenly is distributed across its upper most face of the sheet whereupon deformation is imparted to the sheet for causing it to assume a configuration consistent with the shape of surface 16 of the tool 14.

For purposes of applying pressure to the face of the sheet 10, a relatively large sheet of polyvinyl chloride film 18 preferably is superimposed on the heat-shocked sheet 10 in a manner such that the peripheral portions of the film extend downwardly from the periphery of the sheet 10. In practice, the peripheral portions of the film 18 manually are grasped and drawn downwardly whereby a sheet-deforming pressure is applied to the upper surface sheet. Due to the inherent resiliency of polyvinyl chloride, it has been found to be particularly suited for this purpose.

Once the sheet 10 has been deformed to a desired configuration, the film 18 is removed and discarded. At this point, the deformed sheet substantially conforms to a fabricated shape having a preselected configuration. However, since the material being employed is a thermosetting material, the deformed sheet is subject to further deformation and therefore the configuration of the shape must be fixed through a final curing operation.

In order to achieve a final curing of the deformed sheet 10, it is removed from the tool 14, inverted and seated on a concave surface 20 of a working tool 22. The concave surface 20 is, in effect, a mirror image of the convex surface 16. However, in order to inhibit further deformation during curing, the convex surface of the deformed sheet 10 is retained in a contiguous relationship with the concave surface 20 by a vacuum applied thereto through a multiplicity of interstices or openings 24 which communicate with a source of vacuum, not shown, through a suitable vacuum conduit 26 and an adjacent vacuum chamber 28. Consequently, the convex surface of the fabricated shape 12 is brought into and retained in a contiguous engagement with the surface 20.

Since the shape 12 is formed of a honeycomb core material it should readily be apparent that as a vacuum is developed within the chamber 28, atmosphere is drawn into the chamber through the openings 24. In order to assure that the shape is subjected to vacuum, two layers 30 of No. 181 glass fabric are superimposed over the concave surface of the shape. Over the layers 30 of glass fabric there is positioned a two-mill nylon vacuum blanket 32, or any other substantially impervious film material found suitable for this purpose. With the vacuum blanket 32 thus supported by the glass fabric, a vacuum is developed in chamber 28, whereupon the adjacent surface of the shape is subjected to a substantially uniform negative pressure while a substantially uniform positive pressure is applied at its opposite surface. The magnitude of the pressure to which the shape 12 is subjected varies upon the particular sheet being employed and the configuration of the shape being fabricated. However, it is to be understood that the pressure is, in practice, sufficient to maintain the shape 12 in a uniformly seated disposition relative to the surface 20 during final curing operations.

Curing of the shape 12 is achieved by positioning the working tool 22 with the shape 12 affixed in place within an oven or an autoclave and cured at a suitable temperature for a predetermined period. Once the curing operation has been completed, the working tool 22 is removed from the heating apparatus and permitted to cool prior to releasing the vacuum in order that the thermosetting sheet 10 be permitted to assume a rigid, final configuration prior to the release of the vacuum.

While the method hereinbefore disclosed may be employed with various types of thermosetting material, it has been found that the method has particular utility with a honeycomb core stock. A specific example of the method embodying the principles of the instant invention includes a series of steps wherein a planar sheet of commercially available, partially cured honeycomb core material having the thickness of three-quarters of an inch is selected. The material employed is a honeycomb core material which commercially is available from the Hexcel Corp. under the trade name HTP Honeycomb core and has a density of four and one-half pounds per cubic foot. The sheet 10 is subjected to 500° F. for twenty-five seconds, using an oven or other equivalent device, for purposes of rapidly heating or heat-shocking the sheet. The sheet is removed from the oven and placed on the convex surface 16 conforming to a segment of a sphere having a fourteen inch radius. A polyvinyl chloride film 18 now is draped across the uppermost surface of the sheet 10 and manually is drawn downwardly about the peripheral edges of the sheet 10 causing a deforming pressure uniformly to be applied to the upper surface of the sheet for imparting deformation to the sheet for causing it to assume a configuration of a shape 12. Once the sheet 10 has been deformed into a preselected configuration, in response to the applied pressure, it is removed from the convex surface and prepared for final curing for thus imparting thereto the characteristics of a cured thermosetting material.

The shape 12 now is inserted within the working tool 22 and seated on the concave surface 20. Two layers 30 of No. 181 glass fabric are positioned across the concave surface of the shape and a superimposing nylon vacuum blanket 32, of a two-mill thickness, is deposited thereover. As a practical matter, in order to avoid lateral crushing, a ring 34 is provided to circumscribe the peripheral edge of the shape. The convex surface of the shape 12 now is subjected to a negative holding pressure, developed by drawing a vacuum through the conduit 26, the chamber 28 and the openings 24. With the shape 12 thus secured in place within the working tool 22, the tool is inserted into an oven or autoclave preheated to 400° F. Once the shape is inserted, the oven is maintained at a temperature of 375° F. for a period of two hours in order to achieve a curing of the honeycomb core material. At the expiration of two hours, the working tool 22 is removed from the oven and permitted to cool to 150° F., whereupon the vacuum is relieved. By maintaining the vacuum during cooling, the resulting shape 12 is permitted to attain a state of rigidity.

Once the sheet has cooled and the vacuum released, the blanket 32 and layers 30 of glass fabric are removed from the surface of the sheet 10 and the sheet 10 then is removed from the working tool 22 as a completed shape 12, as illustrated in FIG. 3.

In view of the foregoing, it should readily be apparent that the present invention provides a simplified method for fabricating shapes conforming to compound curves, fabricated from materials which heretofore have been deemed quite difficult to fabricate into precise configurations through techniques requiring an application of stress developing pressures.

Although the invention has been shown and described in what is conceived to be the most practical and preferred

What is claimed is:

1. A method of forming shapes employable as center sections for aeroshells conforming to compound curves from planar sheets of thermosetting honeycomb core material comprising the steps of:
    (A) selecting a substantially rigid sheet of a partially cured thermosetting honeycomb core material of a substantial planar configuration;
    (B) heat shocking said sheet by rapidly elevating the temperature thereof to a first point well above its curing temperature and maintaining the temperature of said sheet at said first point for a period of time insufficient to achieve a curing thereof, whereby the rigidity of said sheet is substantially removed therefrom;
    (C) positioning said sheet in its heat shocked state over a first supporting surface conforming to a predetermined compound, convex curvature;
    (D) uniformly deforming said sheet in a manner such that the sheet is caused to conform simultaneously to the curvature of said first supporting surface;
    (E) removing the deformed sheet from said first supporting surface and thereafter depositing said sheet on a second supporting surface conforming to a predetermined compound, concave curvature;
    (F) depositing multiple layers of glass fabric across said sheet;
    (G) positioning a two-mill nylon blanket across said layers;
    (H) affixing said sheet to said second supporting surface by applying a vacuum to the interface between said second supporting surface and said sheet; and
    (I) curing said deformed sheet as it is affixed to said second supporting surface by varying the temperature of the sheet to a second point coinciding with the curing temperature of said material, and maintaining the temperature of said sheet at the second point for a period sufficient to effect a curing thereof.

2. The method of claim 1 wherein the step of deforming said sheet of honeycomb material includes:
    (A) positioning a flexible member over said sheet in a manner such that the member is permitted to extend downwardly from the peripheral edges of said sheet; and
    (B) applying a substantially uniform and downwardly directed force to the member for establishing a substantially uniform pressure across the surface of said sheet for thereby deforming said sheet into contiguous engagement with said surface.

3. The method of claim 1 wherein said supporting surfaces conform to a class of compound curves, including a segment of a sphere.

References Cited

UNITED STATES PATENTS

| 3,356,781 | 12/1967 | Sulewski | 264—137 |
| 2,462,940 | 3/1949 | Bowes | 264—316 X |
| 2,863,168 | 12/1958 | Buckley | 264—80 |
| 2,668,327 | 2/1954 | Steele | 264—137 |
| 2,978,806 | 4/1961 | Herbert | 264—316 X |
| 3,146,148 | 8/1964 | Mitchella | 264—90 X |

ROBERT F. WHITE, Primary Examiner

R. R. KUCIA, Assistant Examiner

U.S. Cl. X.R.

264—80, 137, 316; 156—196